United States Patent
Ito et al.

(10) Patent No.: US 8,355,014 B2
(45) Date of Patent: Jan. 15, 2013

(54) AMBIENT LIGHT DETECTION DEVICE

(75) Inventors: Daisuke Ito, Minato-ku (JP); Yoshitoshi Kida, Minato-ku (JP); Takeya Takeuchi, Minato-ku (JP); David Pusey, Basingstoke (GB); Peter Shadwell, Tadley (GB); Shunsuke Noichi, Minato-ku (JP)

(73) Assignee: Sony Corporation, Tokyo (JP)

( * ) Notice: Subject to any disclaimer, the term of this patent is extended or adjusted under 35 U.S.C. 154(b) by 418 days.

(21) Appl. No.: 12/467,715

(22) Filed: May 18, 2009

(65) Prior Publication Data

US 2009/0284507 A1 Nov. 19, 2009

(30) Foreign Application Priority Data

May 16, 2008 (GB) .................................. 0808979.9

(51) Int. Cl.
*G06F 3/038* (2006.01)
(52) U.S. Cl. ....................................................... 345/207
(58) Field of Classification Search .................... 345/87, 345/101, 102, 207; 349/116
See application file for complete search history.

(56) References Cited

U.S. PATENT DOCUMENTS

| | | | |
|---|---|---|---|
| 6,670,953 B1 * | 12/2003 | Ozawa ............................ | 345/211 |
| 6,947,102 B2 * | 9/2005 | den Boer et al. ................ | 349/12 |
| 2002/0154084 A1 | 10/2002 | Tanaka et al. | |
| 2002/0180899 A1 | 12/2002 | Lin et al. | |
| 2003/0095091 A1 | 5/2003 | Enomoto et al. | |
| 2005/0140641 A1 * | 6/2005 | Kim et al. ....................... | 345/102 |
| 2005/0151065 A1 | 7/2005 | Min | |
| 2005/0253829 A1 | 11/2005 | Mamba et al. | |
| 2006/0267948 A1 * | 11/2006 | Takahashi ...................... | 345/168 |
| 2007/0152952 A1 | 7/2007 | Kang et al. | |
| 2007/0166860 A1 | 7/2007 | Tanaka et al. | |
| 2008/0100566 A1 * | 5/2008 | Miyasaka et al. .............. | 345/107 |
| 2008/0157682 A1 * | 7/2008 | Kwon ............................ | 315/154 |
| 2009/0073107 A1 * | 3/2009 | Chen et al. ..................... | 345/102 |
| 2009/0146981 A1 * | 6/2009 | Chen et al. ..................... | 345/207 |
| 2009/0160815 A1 * | 6/2009 | Steer ............................. | 345/173 |

(Continued)

FOREIGN PATENT DOCUMENTS

KR 10-2006-0007972 1/2006

(Continued)

OTHER PUBLICATIONS

Communication pursuant to Article 94(3) EPC, issued May 23, 2011, in European Patent Application No. 09 250 779.7.

(Continued)

*Primary Examiner* — Chanh Nguyen
*Assistant Examiner* — Pegeman Karimi
(74) *Attorney, Agent, or Firm* — Oblon, Spivak, McClelland, Maier & Neustadt, L.L.P.

(57) ABSTRACT

An ambient light detection device for use with a liquid crystal display having an array of liquid crystal cells, each liquid cell having at least one transistor for selectively connecting that liquid crystal cell to a signal line and each transistor having a gate connected to a gate line and having a gate supply line selectively connectable to the gate line for turning off the gates. The device includes a current measuring circuit configured to measure the current flowing in the gate supply line as a result of gate leakage current in the gates to which the gate supply line is connected and a controller connected to the measuring circuit and configured to calculate, from the measured current, the level of ambient light reaching the gates.

10 Claims, 8 Drawing Sheets

U.S. PATENT DOCUMENTS

| | | |
|---|---|---|
| 2009/0251445 A1 | 10/2009 | Ito et al. |
| 2009/0251629 A1 | 10/2009 | Ito et al. |
| 2009/0295786 A1 | 12/2009 | Ito et al. |

FOREIGN PATENT DOCUMENTS

| | | |
|---|---|---|
| WO | WO 2007/072377 A3 | 6/2007 |
| WO | WO 2008/155609 A1 | 12/2008 |

OTHER PUBLICATIONS

Extended European Search Report issued Jan. 28, 2011, in Patent Application No. 09250842.3.

Examination Report dated Dec. 16, 2011, in United Kingdom Patent No. GB0809584.6 (with English-language translation).

* cited by examiner

AMBIENT LIGHT DETECTION DEVICE

CROSS-REFERENCE TO RELATED APPLICATIONS

This application claimed the benefit of priority under 35 U.S.C. §199 from GB Patant Application No. 0808979.9 filed May. 16, 2008. The entire contents of which is incorporated herein the reference.

BACKGROUND OF THE INVENTION

1. Field of the Invention

The present invention relates to an ambient light detection device and a method of detecting a level of ambient light, in particular for use with a liquid crystal display module and also a liquid crystal display module itself implementing such a device and method.

2. Description of the Related Art

Liquid crystal displays are well known using a two-dimensional array of liquid crystal cells in which the cells share a plurality of signal lines in one direction and are selectively enabled by gate lines in a perpendicular direction. Drive circuits are provided which use the gate lines to enable respective sets of liquid crystal cells. The signal lines are then used to provide video signal levels to the enabled cells to charge those cells to the level required to give those cells their desired brightness.

It is usual to group the liquid crystal cells together to form image pixels. Each image pixel would typically include three liquid crystal cells corresponding respectively to red, green and blue. The red, green and blue liquid crystal cells of a pixel are provided on the same gate line and, indeed, can be driven by the same video signal. In particular, with a gate line enabling all of the liquid crystal cells of the pixel, the video signal is provided first to the red liquid crystal cell by means of its signal line, then to the green liquid crystal cell by means of its signal line and finally to the blue liquid crystal cell by means of its signal line.

Previously, it has been known to provide liquid crystal display modules with photo diodes around the liquid crystal display itself. The photo diodes may be provided separately from the module or may be constructed as part of the module, for instance in the liquid crystal display panel itself. The photo diodes provide an indication of the level of ambient light and allow improved control of the liquid crystal display module. For example, where the liquid crystal display module includes a back light for providing light through the liquid crystal display cells of the liquid crystal display, the brightness of the back light can be varied according to the detected level of ambient light.

OBJECTS AND SUMMARY OF THE INVENTION

The present invention recognises for the first time the possibility of detecting ambient light using parts of the liquid crystal display itself and without the need of additional photo diodes. In particular, the present invention is at least partly based on a recognition that incident light will cause a gate leakage current in the gate lines of the liquid crystal display as a result of electron-hole pairs being formed in the channels of the transistors in the liquid crystal display.

According to the present invention, there is provided a method of detecting a level of ambient light on a liquid crystal display, the liquid crystal display having an active area including an array of liquid crystal pixels. The method includes measuring the current flowing in the active area and calculating, from the measured current, the level of ambient light falling on the liquid crystal display.

According to the present invention, there is also provided an ambient light detection device for use with a liquid crystal display having an active area including an array of liquid crystal pixels. The device includes a current measuring circuit configured to measure the current flowing in the active area and a controller connected to the measuring circuit and configured to calculate, from the measured current, the level of ambient light falling on the liquid crystal display.

In this way, it is possible to calculate a level of ambient light incident on the liquid crystal display without the need for additional photo detectors. Because the detection of ambient light is carried out across at least an area of the liquid crystal display itself, the accuracy of measurement is potentially improved. Furthermore, because it is not necessary to position photo detectors around the outside of the liquid crystal display area, there is an improvement in space efficiency. By avoiding the need of the use of photo detectors, overall manufacture can be simplified and cost reduced. Also, overall power consumption can be reduced.

For the method, preferably, the step of measuring includes measuring the current flowing in one or more liquid crystal pixels in the active area. Similarly, for the ambient light detection device, the current measuring circuit may be configured to measure the current flowing in one or more liquid crystal pixels in the active area.

In this way, the pixels themselves are used to detect ambient light such that there is no need to include additional components in the active area and usage of space is not compromised.

Preferably, each liquid crystal pixel includes a respective liquid crystal cell, each liquid crystal cell having at least one transistor for selectively connecting that liquid crystal cell to a signal line and each transistor having a gate connected to a gate line and having a gate supply line selectively connectable to the gate line for turning off the gates. With this arrangement, the current is measured by measuring the current flowing in the gate supply line as a result of gate leakage current in the gates to which the gate supply line is connected. In this way, the controller may calculate the level of ambient light reaching the gates.

It will be appreciated that it is also possible to measure other leakage currents to achieve the same effect.

The liquid crystal display may be provided with driving circuits in the active area. In this case, the current may be measured by measuring the current flowing in one or more driving circuits in the active area.

According to the present invention, there is provided a method of detecting a level of ambient light on a liquid crystal display, the liquid crystal display having: an array of liquid crystal cells, each liquid crystal cell having at least one transistor for selectively connecting that liquid crystal cell to a signal line and each transistor having a gate connected to a gate line; and having a gate supply line selectively connectable to the gate lines for turning off the gates. The method includes measuring the current flowing in the gate supply line as a result of gate leakage current in the gates to which the gate supply line is connected and calculating, from the measured current, the level of ambient light reaching the gates.

According to the present invention, there is also provided an ambient light detection device for use with a liquid crystal display module having: an array of liquid crystal cells, each liquid cell having at least one transistor for selectively connecting that liquid crystal cell to a signal line and each transistor having a gate connected to a gate line; and having a gate supply line selectively connectable to the gate line for turning off the gates. The device includes a current measuring circuit configured to measure the current flowing in the gate supply line as a result of gate leakage current in the gates to which the gate supply line is connected and a controller connected to the measuring circuit and configured to calculate, from the measured current, the level of ambient light reaching the gates.

Preferably, the controller is configured to compensate for variations in temperature of the liquid crystal display when calculating the level of ambient light.

With varying temperature, the gate leakage current may vary. Also, the background gate leakage current not due to incident light may also vary. By compensating for this, the controller is able to provide a more accurate indication of the true level of ambient light.

The present invention could be used in conjunction with a liquid crystal display having a back light for illuminating the liquid crystal cell. Preferably, in this case, the controller is configured to compensate for the effect of the back light when calculating the level of ambient light.

Thus, if the gate leakage current is measured from transistors of liquid crystal cells which themselves are exposed to the back light, by judging the amount of gate leakage current caused by the back light itself, the measured gate leakage current can be compensated so as to provide a more true indication of the level of ambient light.

It is also possible for the controller to adjust the brightness of the back light according to the calculated level of ambient light.

In this way, the overall brightness of the LCD display can be varied according to the measured ambient light, for example increased when in bright ambient conditions.

According to the present invention, there may be provided a display module which includes not only the ambient light detection device, but also a liquid crystal display.

The liquid crystal display module preferably includes a series of switches for selectively connecting the gate lines to the gate supply line. As is well known, the gate supply is supplied with a voltage suitable for turning off the gates of the pixels/sub-pixels of the liquid crystal display.

The controller of the liquid crystal display module may be configured to turn off all of the transistors at some point, for instance, between fields/frames of display. At that time, the ambient light detection device can be used to measure the current flowing in the gate supply line as a result of gate leakage current.

Preferably, the liquid crystal display further includes at least one reference transistor and masking configured to shield the at least one reference transistor from ambient light.

The current measuring circuit may be configured further to measure the leakage current in the at least one reference transistor. The controller may then be configured to compensate the calculated level of ambient light using the measured current from the at least one reference transistor.

Because the masked reference transistor does not receive incident ambient light, any gate leakage current produced by the reference transistor can be used as an indication of background noise and deducted appropriately from the measure of current from the other transistors of the liquid crystal cells which are exposed to incident ambient light.

The liquid crystal display module may be provided in a number of different devices, such as a mobile telephone or a camera.

DETAILED DESCRIPTION OF THE PREFERRED EMBODIMENTS

The invention will be more clearly understood from the following description, given by way of example only, with reference to the accompanying drawings.

Figure 1:
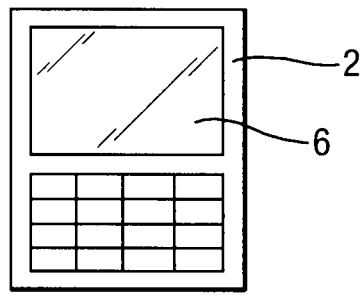
FIG. 1 illustrates a mobile telephone in which the present invention may be embodied.
Figure 2:
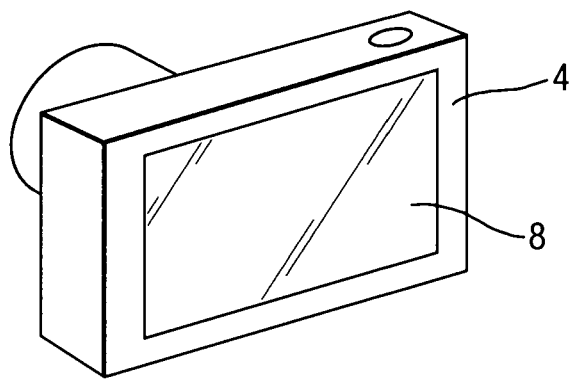
FIG. 2 illustrates a camera in which the present invention may be embodied.

The present invention is applicable to LCD (Liquid Crystal Display) modules such as are used in mobile telephone devices or digital cameras, for instance as illustrated respectively in FIGS. 1 and 2. The present invention could be applied to any LCD, including those with LCD driving circuits formed on the display panel of the LCD module itself.

In the mobile telephone device 2 of FIG. 1 and the digital camera 4 of FIG. 2, respective LCD modules 6 and 8 are provided for displaying images as required.

Figure 3:
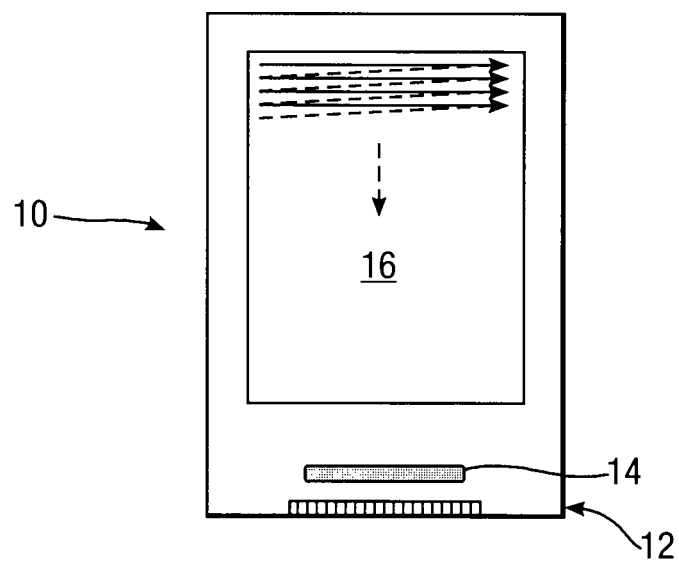
FIG. 3 illustrates a liquid crystal display module in which the present invention may be embodied.

FIG. 3 illustrates an LCD module 10 which is suitable for use in mobile telephone devices and digital cameras and which embodies the present invention.

The LCD module 10 includes at least one plate 12 made of glass (or any other suitable transparent material) against which a liquid crystal display 16 is formed in any known manner. In the illustrated embodiment, a driving circuit 14 is also formed on the glass plate 12. An LCD driving circuit 14 which could incorporate the ambient light detection is illustrated at a lower portion of the display module 10. A similar driving circuit could be provided at any portion of the glass plate 12 around the display area 16 or, indeed, in a distributed manner around the display area 16.

Figure 4:
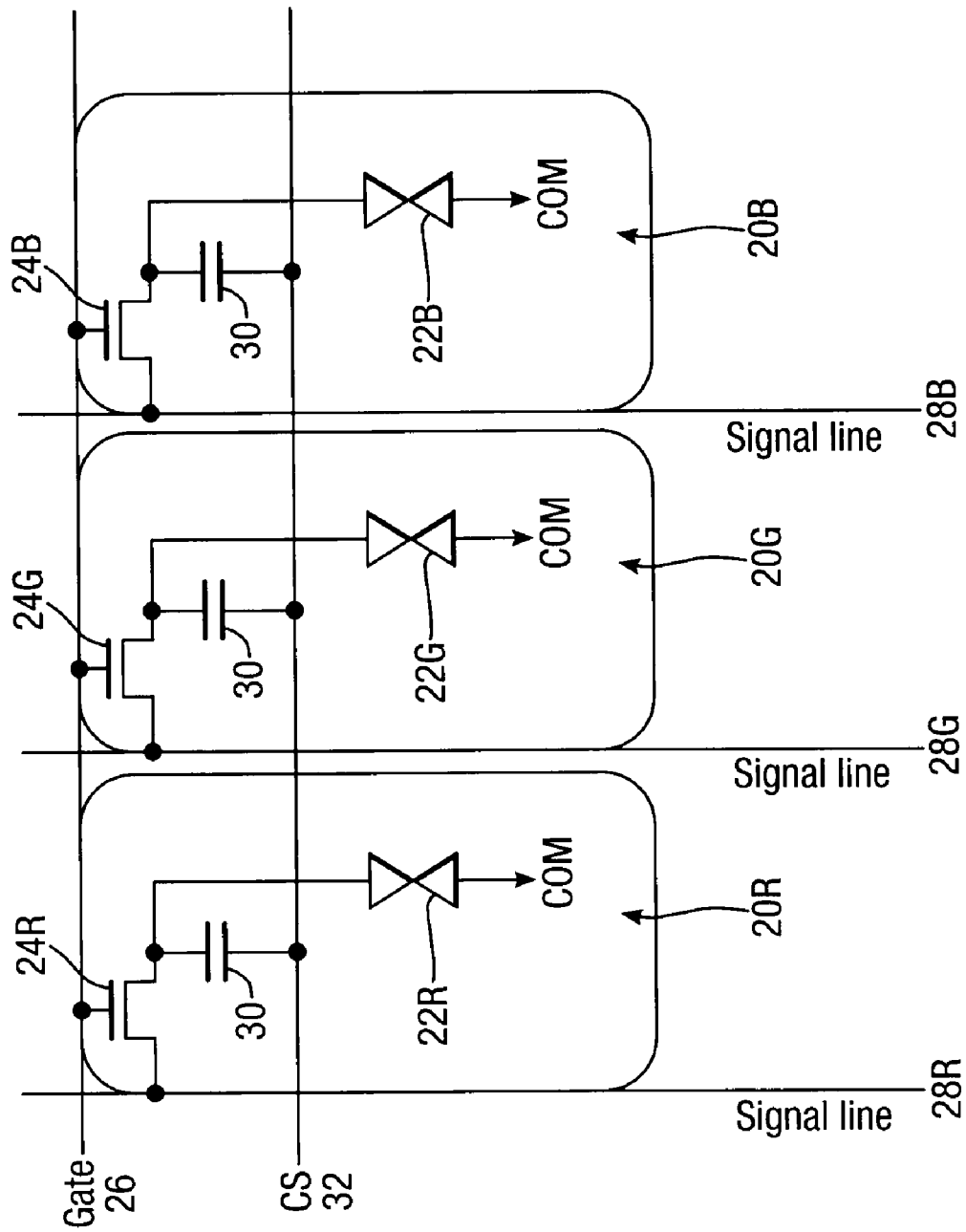
FIG. 4 illustrates schematically three pixel units of a pixel of a liquid crystal display.

FIG. 4 illustrates one example of how the display area 16 can be implemented.

The display area 16 is divided into a two-dimensional array of pixels. The pixels extend in horizontal rows in a first direction and in vertical columns in a second direction. By activating each pixel with a desired colour and brightness, an appropriate image can be displayed on the display 16.

In order to produce a variety of different colours, each pixel includes three pixel units 20R, 20G, 20B (otherwise known as sub-pixels) respectively for producing red, green and blue. FIG. 4 illustrates the three pixel units 20R, 20G, 20B of a pixel arranged side by side in the first (horizontal) direction. In this respect, it should be appreciated that the three pixel units 20R, 20G, 20B should be located close to one another in order to provide the desired visual combined colour, but the exact positioning of the pixel units is not critical.

Each of the pixel units 20R, 20G, 20B includes a corresponding liquid crystal cell 22R, 22G, 22B. One side of every liquid crystal cell 22R, 22G, 22B is connected to a common line COM which, in the preferred embodiment, is formed as part of the glass plate 12 itself. The opposite side of each liquid crystal cell 22R, 22G, 22B is connected to a respective control transistor or switch 24R, 24G, 24B.

As illustrated, all of the switches 24R, 24G, 24B in a row are controlled, in other words switched on or off, by means of a common gate line 26. A respective gate line is provided for each of the rows of the display 16. On the other hand, the inputs to the switches 24R, 24G, 24B are connected to signal lines 28R, 28G, 28B. In particular, all of the red pixel units 20R in the same column are connected to a single respective signal line 28R, all of the green pixel units 20G in the same column are connected to a single respective signal line 28G and all of the blue pixel units 20B in the same column are connected to a single respective signal line 28B.

In order to display an image on the display area 16 of the LCD module 10, an image is provided row by row. A particular gate line 26 is driven to a voltage so as to turn on all of the switches or transistors 24R, 24G, 24B in its respective row. While that gate line enables that particular row or horizontal line, first all of the red signal lines 28R are used to drive all of the red liquid crystal cells 22R in that row, then all of the green signal lines 28G are used to drive all of the green LCD cells 22G in that particular row and, finally, all of the blue signal lines 28B are used to drive all of the blue liquid crystal cells 22B in that particular row. Preferably, all of the pixel units 20R, 20G, 20B of a particular colour are driven simultaneously. However, other arrangements are also possible.

With one row or horizontal line written, the corresponding gate line 26 is driven to a voltage to turn off all of its corresponding switches or transistors 24R, 24G, 24B and another gate line is driven to a voltage to turn on its corresponding switches. Adjacent gate lines 26 can be driven one after the other, but other arrangements are possible. It will also be appreciated that different arrangements of arrays of pixel units can be provided to achieve the same effect.

In practice, the liquid crystal capacitance is somewhat variable and it becomes difficult, with only the arrangement described above, to drive reliably the liquid crystal cells 22R, 22G, 22B to the appropriate or desired brightness levels. To help compensate for the variability of the liquid crystal cells 22R, 22G, 22B, CS capacitors 30 are provided in parallel with the liquid crystal cells 22R, 22G, 22B. As illustrated, the CS capacitors 30 are provided between the signal driving end of the liquid crystal cells 22R, 22G, 22B and a CS line 32. For the arrangement described above, a CS line 32 is provided for each respective row or horizontal line. Thus, the CS capacitors 30 of all of the pixel units 20R, 20G, 20B of a respective row or horizontal line are connected to a corresponding respective CS line 32.

The CS line 32 is driven with a voltage corresponding closely to the voltage of the common voltage COM. In this way, variations in the capacitance of the liquid crystal cells 22R, 22G, 22B have less effect on driving of those liquid crystal cells 22R, 22G, 22B.

Figure 5:
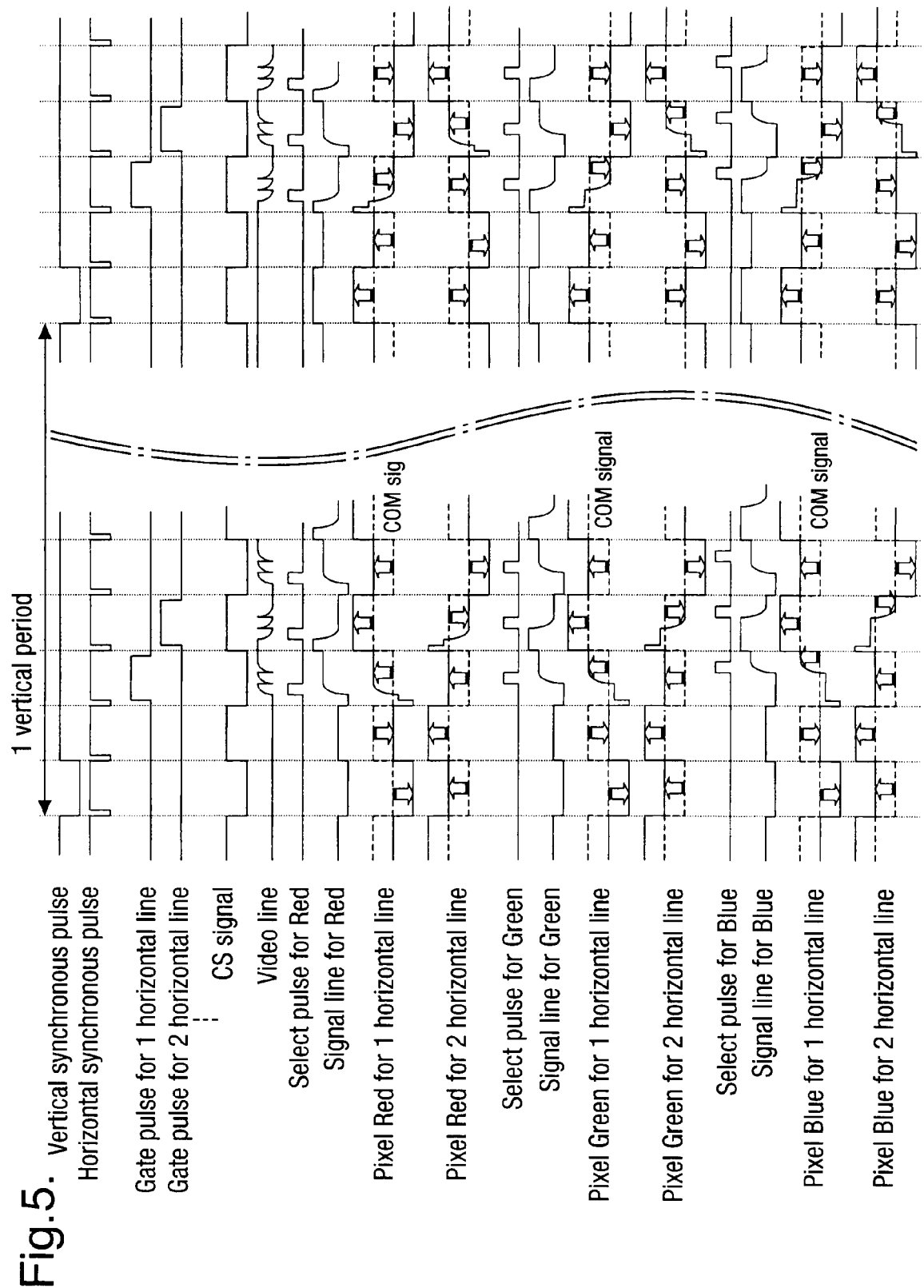
FIG. 5 illustrates the timing of signals for driving the pixel units of FIG. 4.

FIG. 5 illustrates various signals for driving the first two horizontal lines of the display 16. In this regard, it is worth noting that, for ongoing operation of the liquid crystal display 16, it is necessary to reverse the polarity applied to the liquid crystal cells 22R, 22G, 22B each time they are used; this is known as inversion. Hence, after each frame is displayed on the display 16, in other words after each vertical period, the polarity is reversed. Also, adjacent horizontal lines or rows are driven with opposite polarities.

As illustrated in FIG. 5, a vertical synchronous pulse having the length of one horizontal timing signifies a new frame. Also, a short horizontal synchronous pulse is provided to indicate each new horizontal line or row.

Gate pulses are shown for the first and second horizontal lines. Each gate pulse lies within the horizontal line period and, during a gate pulse, the respective row or horizontal line of pixel units 20R, 20G, 20B are enabled in the manner described above. Thus, during the gate pulse for the first horizontal line, all of the switches/transistors 24R, 24G, 24B of the first horizontal line are enabled, but none others. Similarly, for the second horizontal gate pulse, only the switches/transistors of the second row or horizontal line are enabled.

In FIG. 5, the voltages for a red pixel unit 20R, a green pixel unit 20G and a blue pixel unit 20B are indicated for first and second horizontal lines. The COM signal is illustrated as a dashed line overlying the voltage illustrated for the liquid crystal cells 22R, 22G, 22B of the pixel units 20R, 20G, 20B. As illustrated, from one horizontal line to the next, the COM signal changes from one voltage state to another. In this way, the polarity applied to adjacent horizontal rows of pixels is reversed. As also illustrated, for the second vertical period (on the right side of FIG. 5), the COM signal is reversed as a whole such that the pixels of a horizontal line are driven with opposite polarity from frame to frame.

The CS signal follows the COM signal with generally the same voltage.

The COM signal and CS signal change can state between zero volts and approximately 5 volts.

Within each horizontal period, respective select pulses are provided for the red pixel units 20R, green pixel units 20G and blue pixel units 20B. In this way, a common video line can be provided for one pixel, that video line including consecutively the driving signal required for the red pixel unit 20R, green pixel unit 20G and blue pixel unit 20B of the same pixel. The select pulses illustrated in FIG. 5 are used to apply appropriate portions of the video line signal to the respective red, green and blue pixel units 20R, 20G, 20B. As a result, during a particular respective select pulse, the signal line for the respective pixel unit 20R, 20G, 20B is driven to the required voltage provided by the common video line signal at that time.

Figure 6:
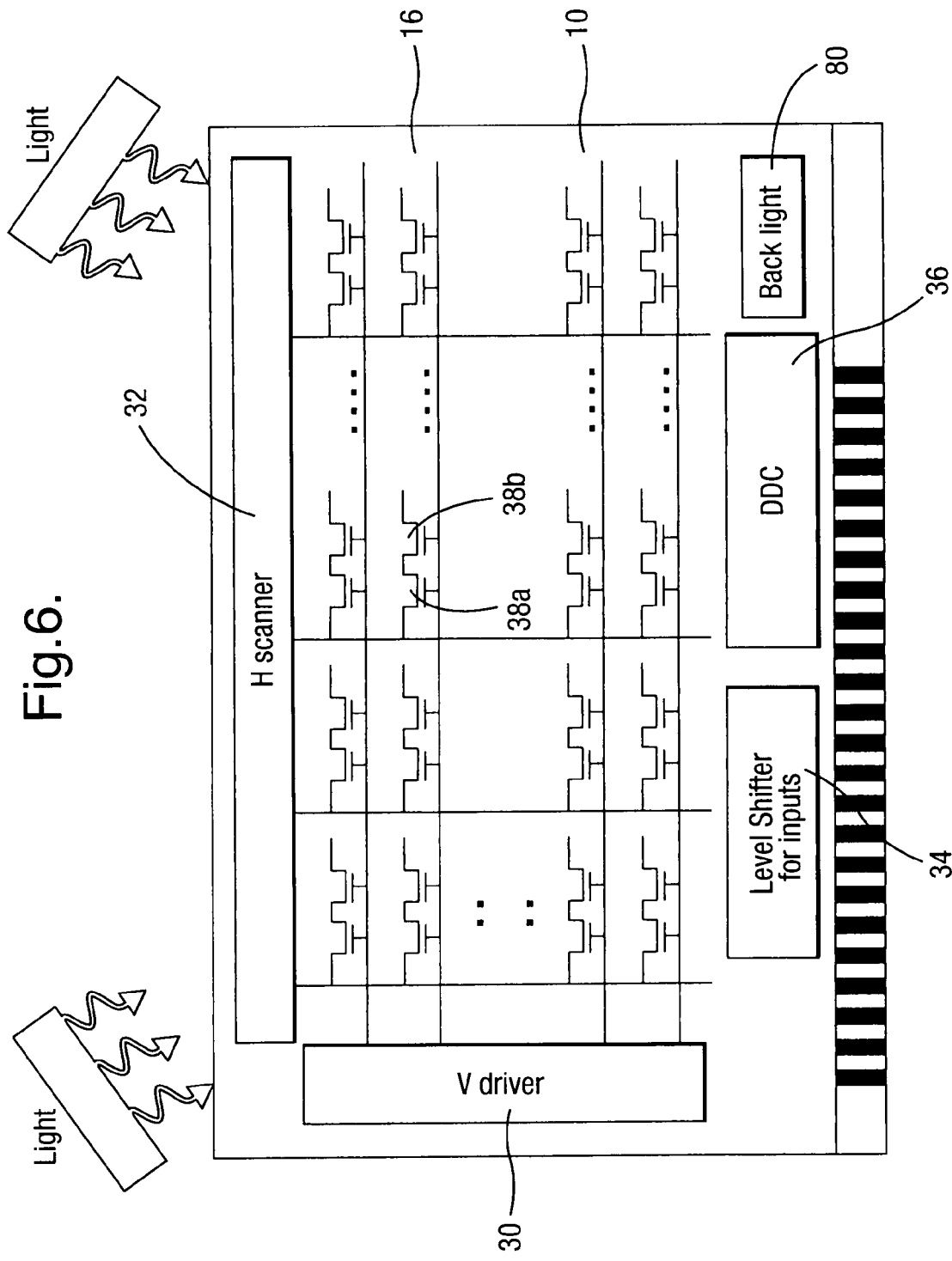
FIG. 6 illustrates schematically a liquid display module embodying present invention.

FIG. 6 illustrates schematically a liquid crystal display module 10 like that of FIG. 3 including a liquid crystal display area 16. As illustrated, the diving circuit 14 of FIG. 3 includes a vertical driver 30, a horizontal scanner 32, a level shifter 34 and a DC to DC converter 36.

FIG. 6 also illustrates schematically the fact that, in practice, the switches 24 for the liquid crystal display cell can be implemented as pairs of transistors 38A, 38B.

In use, a display module will usually be subject to incident ambient light as illustrated schematically in FIG. 6. It can be useful to determine the amount of that ambient light. For example, it may be desirable to reduce the brightness of a displayed image in low ambient light conditions. Reducing the brightness in this way can be beneficial in reducing power consumption.

Figure 7:
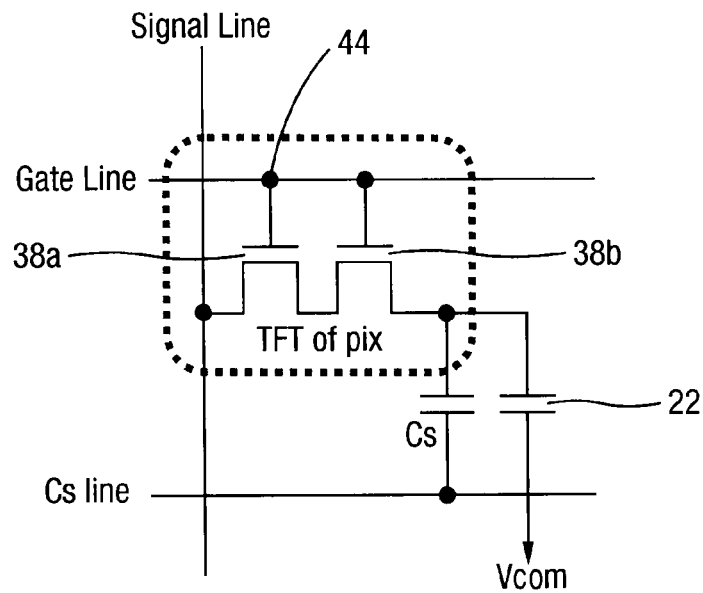
FIG. 7 illustrates an individual pixel of the display module of FIG. 6.

FIG. 7 illustrates in slightly more detail an individual pixel or sub pixel having a pair of thin film transistors (TFT) 38A, 38B for driving a liquid crystal display cell 22.

The present application recognises that light incident upon the active area of the liquid crystal display will generate electron-hole pairs in the channels of the TFT pixel transistors 38A, 38B.

Figure 8:
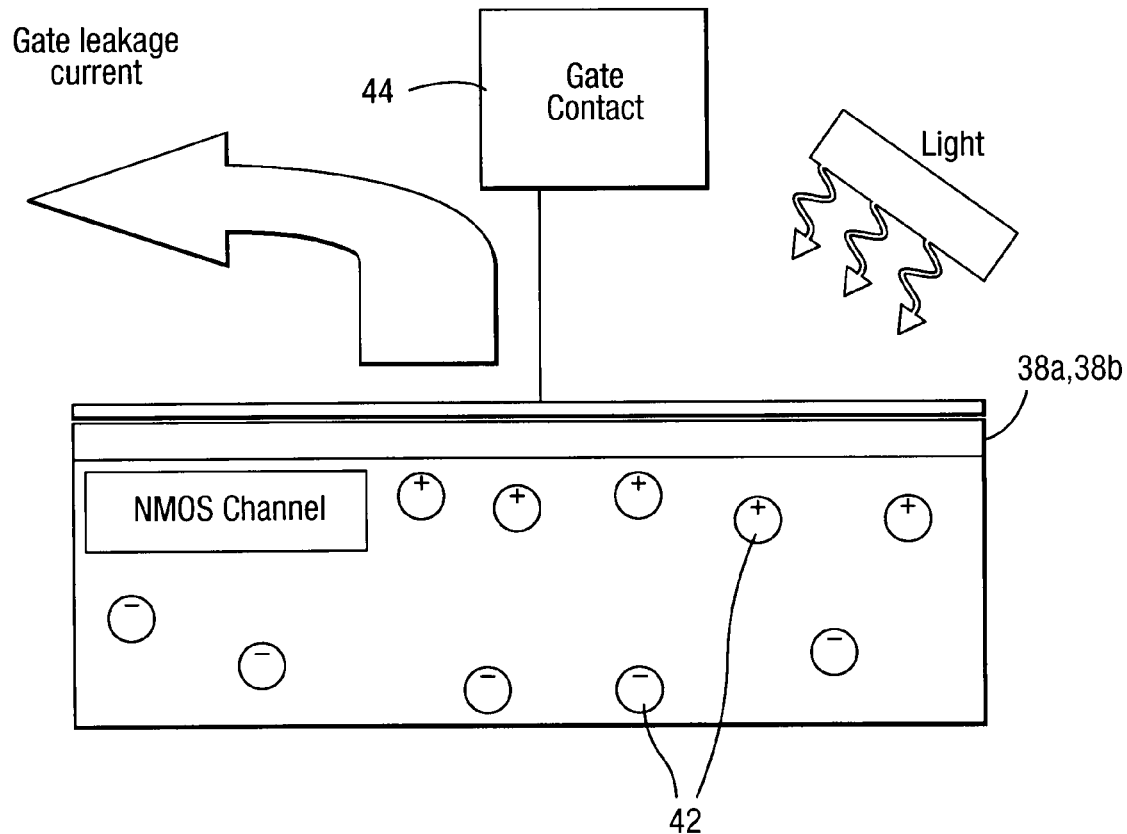
FIG. 8 illustrates schematically the channel of a transistor of a liquid crystal display.

FIG. 8 illustrates the NMOS channel 40 of one of the TFT transistors 38A, 38B. When light reaches the channel 40, electron-hole pairs 42 are formed and these become apparent as the leakage current through the gate contact 44 of the TFT transistor.

Figure 9:
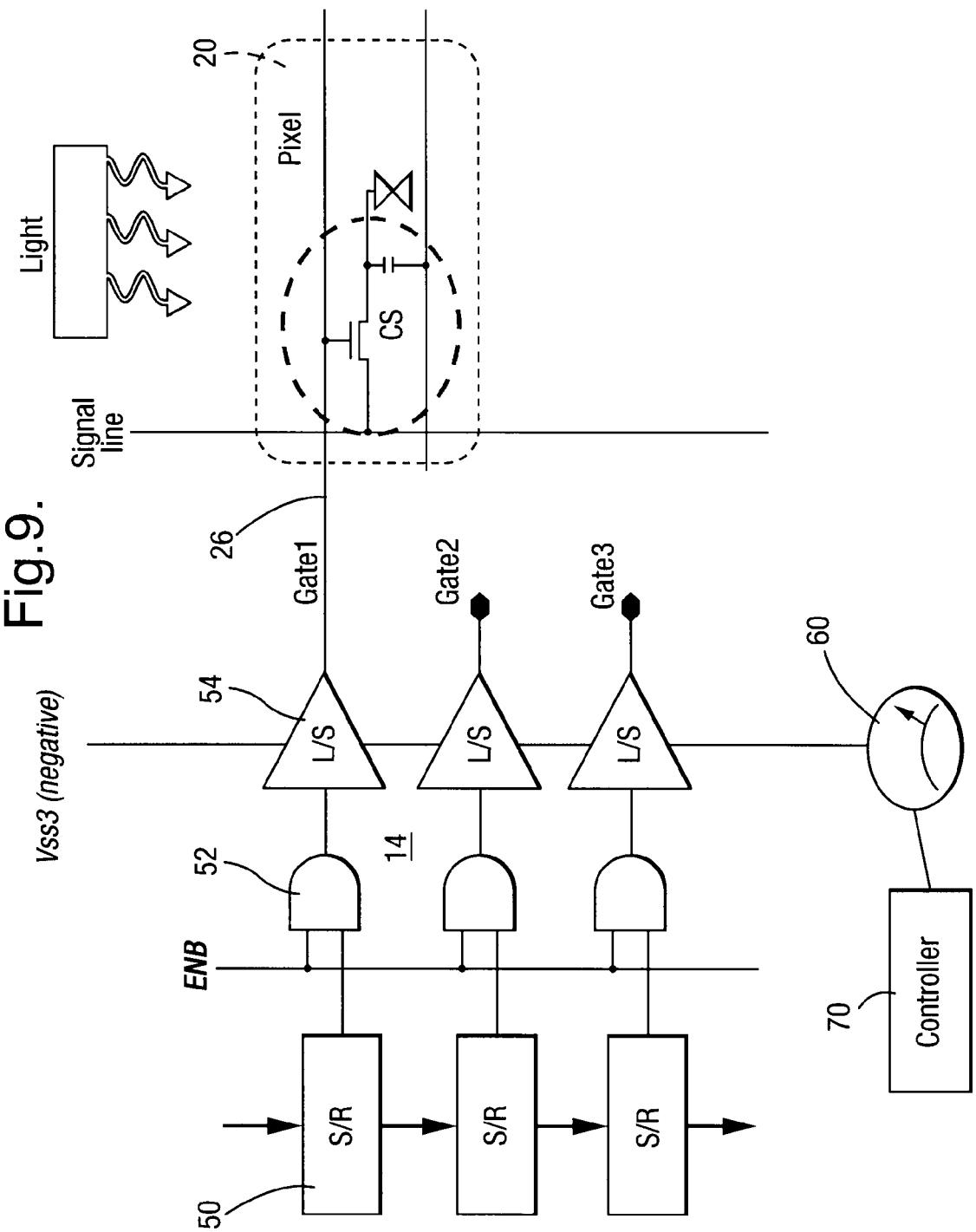
FIG. 9 illustrates schematically part of a liquid crystal display module embodying the present invention.

FIG. 9 illustrates schematically one pixel (or sub pixel) as connected to the driving circuit 14.

During use of the liquid crystal display in displaying images, the driving circuit 14 uses a series of shift registers 50 and logic gates 52 to operate the appropriate gate lines 26 when required. When the gate lines 26 are required to turn off their respective TFT's, the gate lines are driven to a predetermined potential VSS3 (as illustrated). A series of respective level shift switches 54 selectively connect the gate lines 26 either to the VSS3 line so as to turn off all of the transistors of that gate line 26 or to that part of the driving circuit for turning on the transistors on the gate line 26.

When the VSS3 potential is applied to the gates so as to turn them off, it becomes possible to detect the gate leakage current resulting from the incident light.

As illustrated schematically in FIG. 9, a current measuring circuit 60 is provided for monitoring the current drawn through the VSS3 line.

The current measuring circuit 60 could be connected so as to monitor the current flowing when individual gate lines are turned off. However, in a preferred embodiment, at predetermined points in the field/frame cycle of the display, for instance between consecutive field/frames, the driving circuit 14 connects all of the gate lines 26 to VSS3 so as to turn off all of the gates. At this time, the current measuring circuit can be used to measure gate leakage current from all of those connected gates.

The current measuring circuit 60 is connected to its own controller 70 or the controller of the driving circuit 14 and is configured to calculate, from the measured gate leakage current, the level of incident ambient light. In this way, an ambient light detection device can be embodied in a liquid crystal display module merely by making use of the transistors of the liquid crystal display cells and without the need of additional photo diode detectors or the like.

It should be appreciated that other leakage currents may be detected and measured within the active area of liquid crystal display in order to provide a measure of incident ambient light. In particular, gate source leakage or currents on the COM line or CS line may be measured. Incident light on an individual pixel (subpixel) may cause various types of leakage current which can be detected in order to provide a measure of incident light.

In addition, as discussed above, it is possible for one or more driving circuits for the pixels to be distributed within the active area of the display. With this arrangement, the drive circuits themselves may be subject to leakage currents as a result of ambient light. Hence, similarly, a measurement of current flowing in one or more driving circuits in the active area of the display can similarly provide an indication of the amount of incident ambient light. It is possible for devices to be integrated into the active area which are so small as not to cause any optical interference to the viewer of the panel. Such devices could include photosensitive transistors and photo diodes. Currents or voltages from these devices in the active area could be used in isolation or in combination with the measurements as discussed above.

The detected level of ambient light can be used in any manner as required. As mentioned above, it can be particularly useful in allowing the controller of the liquid crystal display module to control the brightness of the liquid crystal display.

As illustrated schematically in FIG. 6, the liquid crystal display module can be provided with a back light 80 for providing light to the liquid crystal display cells. Having determined the level of ambient incident light, it is possible to control the back light to produce light of an appropriate brightness.

In a preferred embodiment, the liquid crystal display module includes features for recalibrating the ambient light detection and compensating for variations, such as temperature.

In one embodiment, it is proposed to provide a portion of the liquid crystal display which is masked off from ambient light. In this way, it is possible to determine the background gate leakage current existing without any incident light. This measure can be used to calibrate the ambient light detection and compensate for natural background leakage current. Also, it is possible that the image being displayed by the liquid crystal display cells themselves can have an influence on the gate leakage current. However, by knowing the actual image being displayed at the time, this to can be compensated for.

Where a back light 80 is provided and is turned on, then the resulting light from the back light will itself produce electron-hole pairs in the TFT channels. This can be compensated for by judging the brightness to which the back light 80 is driven at that time.

Figure 10:
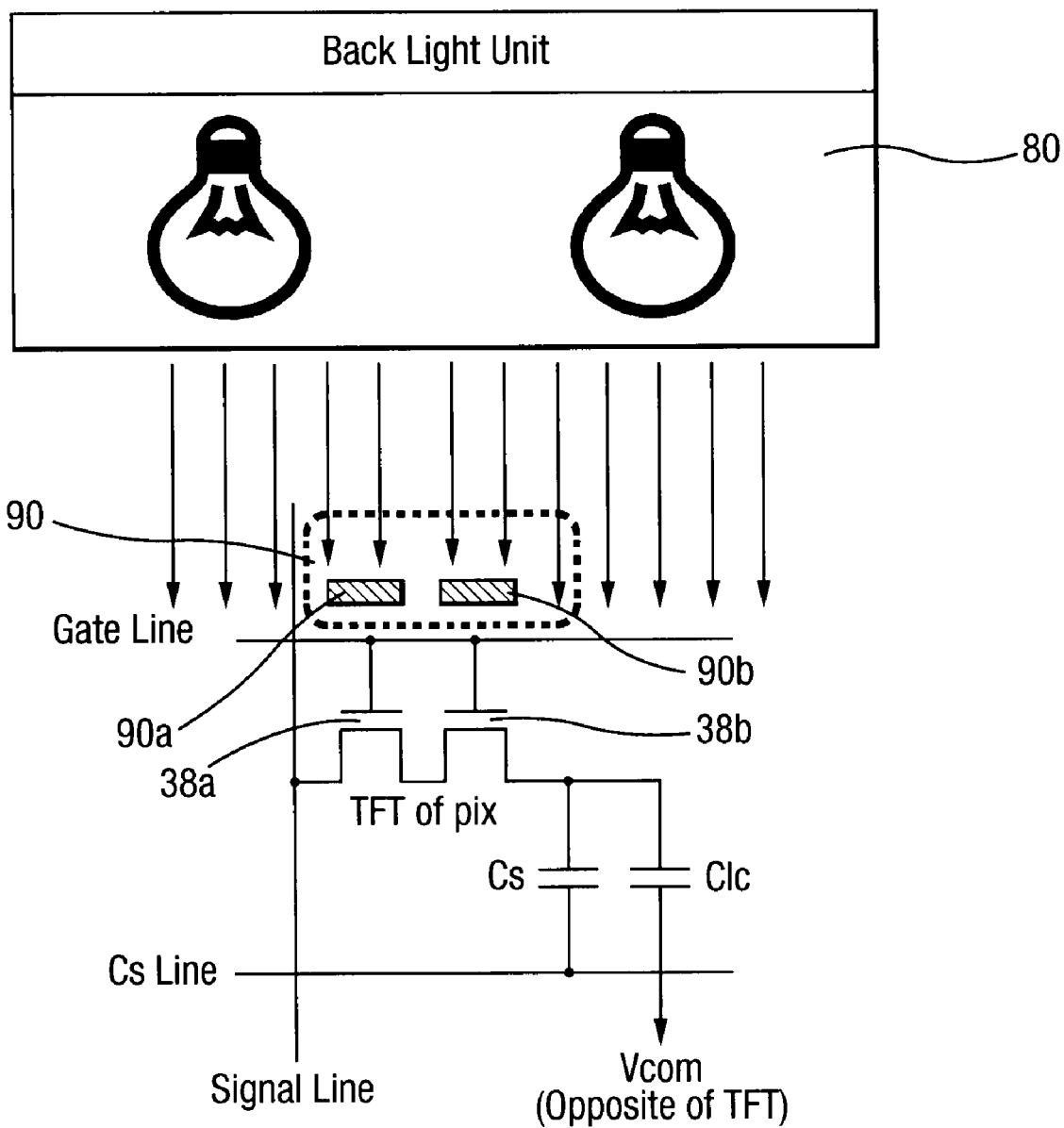
FIG. 10 illustrates schematically masking of pixel transistors from a backlight.

In the embodiment illustrated in FIG. 10, in order to prevent the back light from affecting leakage current measurement for the pixel transistors 38a, 38b, a shield layer 90 is provided between the panel backlight and every pixel transistor 38a, 38b.

As illustrated, individual masks 90a and 90b are provided for the respective transistors 38a and 38b. The shield layer 90 and its respective masks 90a and 90b prevent light from the back light entering the pixel transistors 38a, 38b such that no leakage current results from the light of the back light.

Figure 11A:
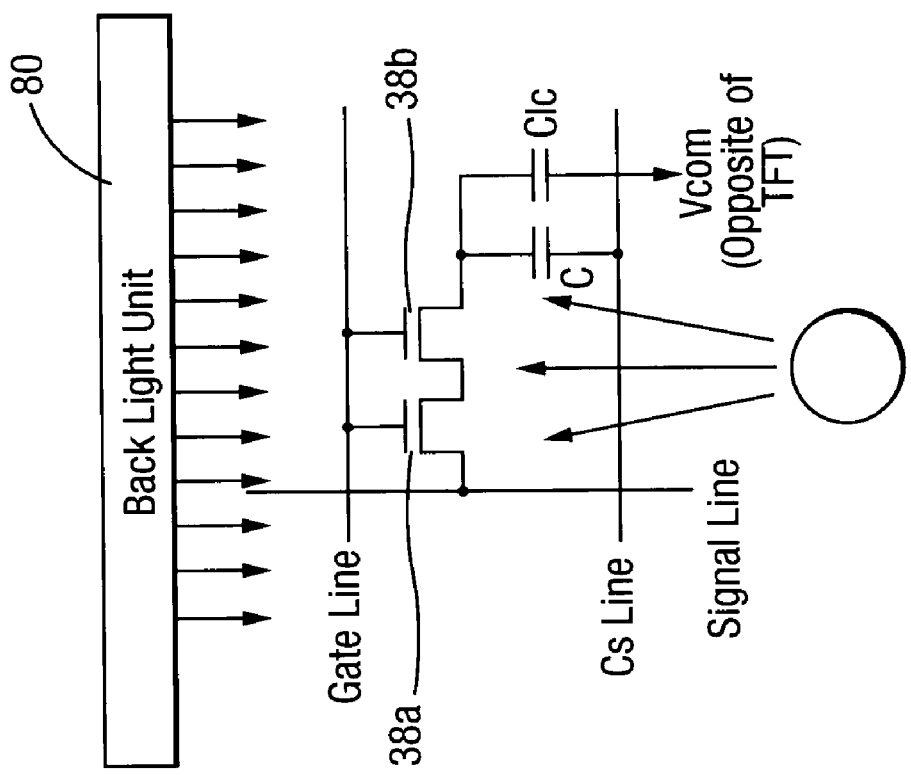
FIGS. 11(a) and (b) illustrate schematically selective masking of pixel transistors from ambient light.
Figure 11B:
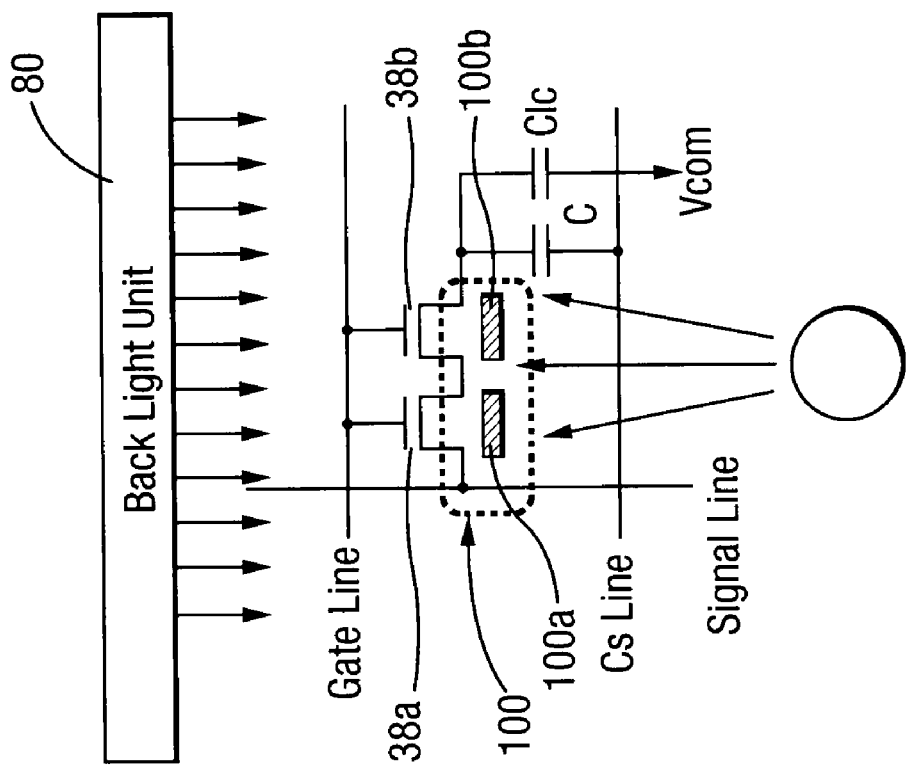

FIGS. 11(a) and (b) illustrate an alternative embodiment where some of the pixels, such as illustrated in FIG. 11(a), are provided with a surface shielding layer 100 including masks 100a and 100b for shielding corresponding pixel transistors 38a and 38b from ambient light. As illustrated in FIG. 11(b), others of the pixels are not provided with any such outer shield for their pixel transistors 38a, 38b.

By deducting the measured leakage current from the shielded pixel transistors as illustrated in FIG. 11(a) from the unshielded pixel transistors as illustrated in FIG. 11(b), an indication of the leakage current resulting only from ambient light is provided.

This approach is advantageous in that temperature and electrical noise effects are largely self-cancelling. The masks 100a, 100b can be produced merely as a modification to a normal colour filter mask.

Preferably, alternate horizontal lines, for instance odd horizontal lines, are provided with masked pixel transistors and the interlaced, for instance even lines, are unmasked. In this way measurements taken from masked and unmasked pixel transistors are spread evenly over the entire surface of the display. Furthermore, it becomes possible to deduct one measured value from another without the need for any compensation factors required to compensate for there being more of one type of pixel transistor than the other.

In both of the embodiments of FIGS. 10 and 11(a) and (b) the individual masks 90a, 90b, 100a, 100b, could be replaced by respective masks covering respective pairs of pixel transistors.

We claim:

1. An ambient light detection device for use with a liquid crystal display having: an array of liquid crystal cells, each liquid cell having at least one transistor for selectively connecting that liquid crystal cell to a signal line and each transistor having a gate connected to a gate line; and having a gate supply line selectively connectable to the gate line for turning off the gates, the device including:

a current measuring circuit electrically connected and configured to measure the current flowing in gate supply lines from a directly connected gate line as a result of all of the gate leakage currents in the gates connected to the gate line to which the gate supply lines are connected, wherein the gate leakage currents are outputted from the gate supply lines to the gate line; and a controller connected to the measuring circuit and configured to calculate, from the measured current, the level of ambient light reaching the gates.

2. An ambient light detection device according to claim 1 wherein the controller is configured to compensate for variations in temperature of the liquid crystal display when calculating the level of ambient light.

3. An ambient light detection device according to claim 1 for use with a liquid crystal display further including a back light for illuminating the liquid crystal cells from behind wherein the controller is configured to compensate for the effect of the back light when calculating the level of ambient light.

4. An ambient light detection device according to claim 1 for use with a liquid crystal display further including a back light for illuminating the liquid crystal cells from behind wherein the controller is configured to adjust the brightness of the back light according to the calculated level of ambient light.

5. An ambient light detection device according to claim 1 for use with a liquid crystal display having driving circuits for the liquid crystal pixels wherein the current measuring circuit is configured to measure the current flowing in one or more driving circuits in the active area.

6. A liquid crystal display module including:

an ambient light detection device for use with a liquid crystal display having: an array of liquid crystal cells, each liquid cell having at least one transistor for selectively connecting that liquid crystal cell to a signal line and each transistor having a gate connected to a gate line; and having a gate supply line selectively connectable to the gate line for turning off the gates, the device including a current measuring circuit electrically connected and configured to measure the current flowing in gate supply lines from a directly connected gate line as a result of all of the gate leakage current in the gates connected to the gate line to which the gate supply lines are directly connected and a controller connected to the measuring circuit and configured to calculate, from the measured current, the level of ambient light reaching the gates, wherein the gate leakage currents are outputted from the gate supply lines to the gate line; and a liquid crystal display having an array of liquid crystal cells, each liquid crystal cell having at least one transistor for selectively connecting that liquid crystal cell to a signal line and each transistor having a gate connected to a gate line, and having a gate supply line selectively connectable to the gate lines for turning off the gates; wherein the liquid crystal display further includes at least one reference transistor and masking configured to shield the at least one reference transistor from ambient light; and the current measuring circuit is configured to measure leakage current in the at least one reference transistor; and the controller is configured to compensate the calculated level of ambient light using the measured current from the at least one reference transistor.

7. A mobile telephone including the ambient light detection device and liquid crystal display according to claim 6.

8. A camera including the ambient light detection device and liquid crystal display according to claim 6.

9. A method of detecting a level of ambient light on a liquid crystal display, the liquid crystal display having: an array of liquid crystal cells, each liquid crystal cell having at least one transistor for selectively connecting that liquid crystal cell to a signal line and each transistor having a gate connected to a gate line; and having a gate supply line selectively connectable to the gate lines for turning off the gates, the method including:

measuring the current flowing in gate supply lines from a directly connected gate line as a result of all the gate leakage current in the gates connected to the gate line to which the gate supply lines are directly connected, wherein the gate leakage currents are outputted from the gate supply lines to the line; and calculating, from the measured current, the level of ambient light reaching the gates.

10. A method according to claim 9 for detecting a level of ambient light on a liquid crystal display having driving circuits for the liquid crystal pixels wherein the step of measuring includes measuring the current flowing in one or more driving circuits in the active area.

* * * * *